United States Patent

[11] 3,559,690

| [72] | Inventor | Patsy B. Palmer<br>Granada Hills, Calif. |
|---|---|---|
| [21] | Appl. No. | 822,884 |
| [22] | Filed | May 8, 1969 |
| [45] | Patented | Feb. 2, 1971 |
| [73] | Assignee | Price-Pfister Brass Mfg. Co.<br>Pacoima, Calif.<br>a corporation of California |

[54] DIVERTER VALVE
9 Claims, 8 Drawing Figs.

[52] U.S. Cl. .................................................. 137/801,
137/467, 137/603
[51] Int. Cl. ................................................... F16k 15/8
[50] Field of Search........................................... 137/801,
603, 604, 467

[56] References Cited
UNITED STATES PATENTS

| 3,387,816 | 6/1968 | Holycross | 137/801X |
| 3,461,901 | 8/1969 | Bucknell | 137/801X |
| 3,473,558 | 10/1969 | Mongerson | 137/467 |

*Primary Examiner*—Harold W. Weakley
*Attorney*—Flam and Flam

ABSTRACT: The new diverter valve utilizes a loose fitting O-ring surrounding a cylinder fitted into the mouth of a spout. A flange on the cylinder expands the O-ring to provide a seal when the cylinder is in its lower position. When the cylinder is raised, a caged lid closes the cylinder. A skirt formed on the lid moves downwardly and acts as a packing gland to constrict the O-ring thus to perfect a seal. When hydraulic pressure is reduced, the pressure on the O-ring is relieved whereby the cylinder is free to fall away under the influence of gravity.

PATENTED FEB 2 1971 3,559,690
SHEET 1 OF 2
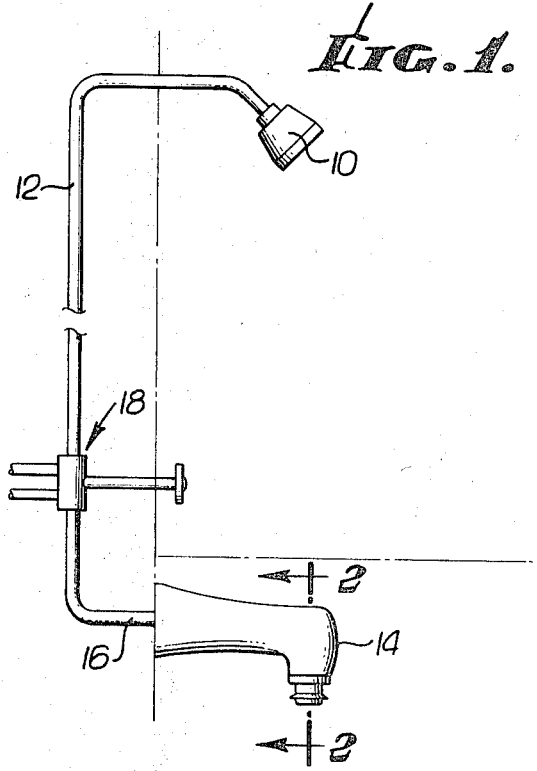
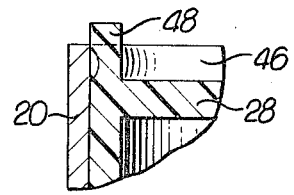
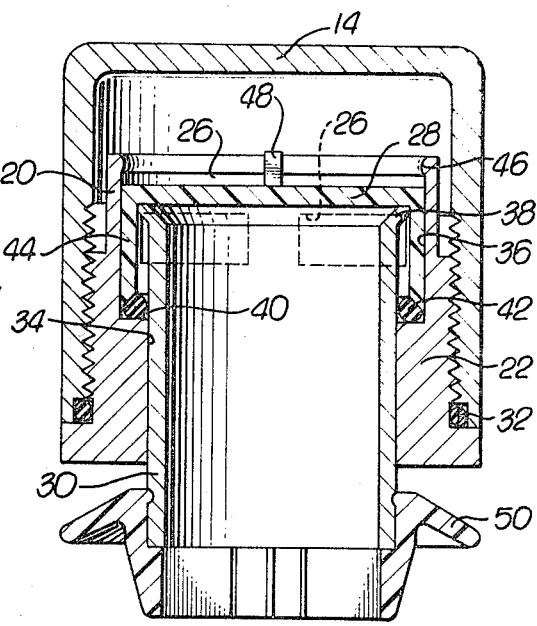
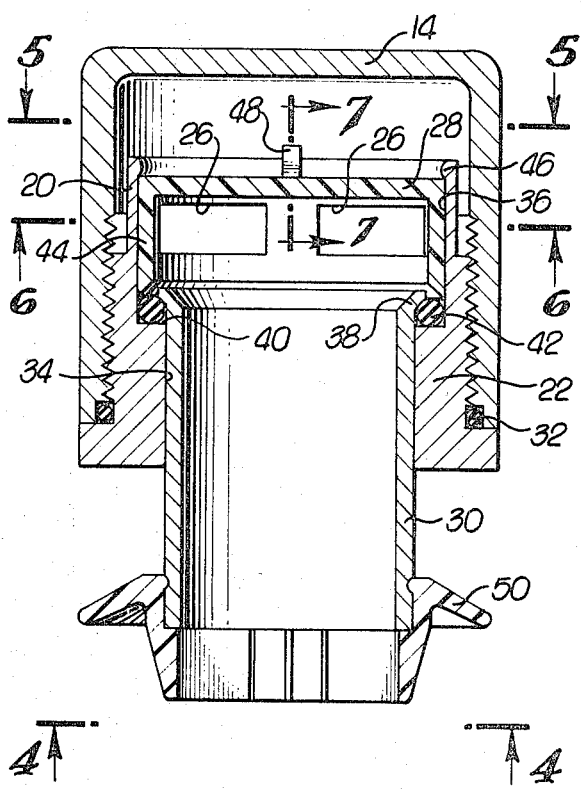
INVENTOR.
PATSY B. PALMER
BY Flam and Flam
ATTORNEYS.

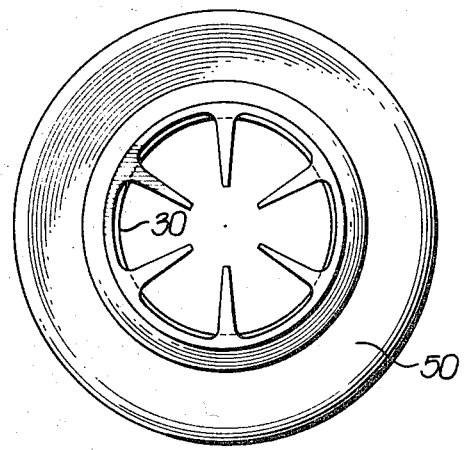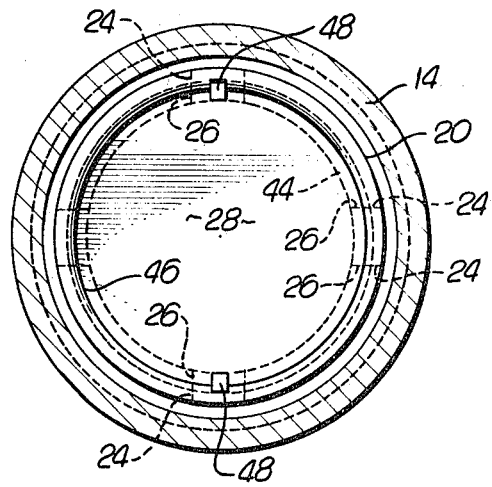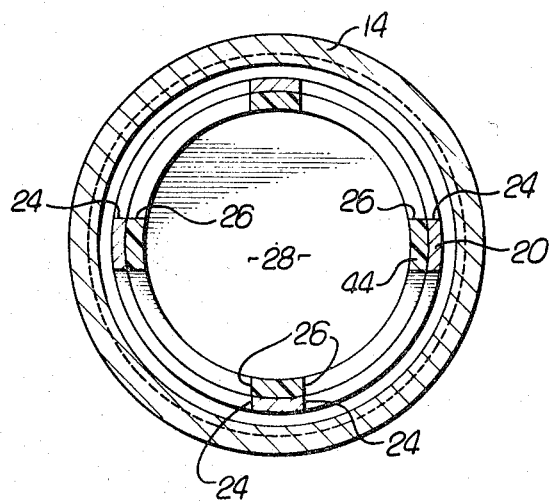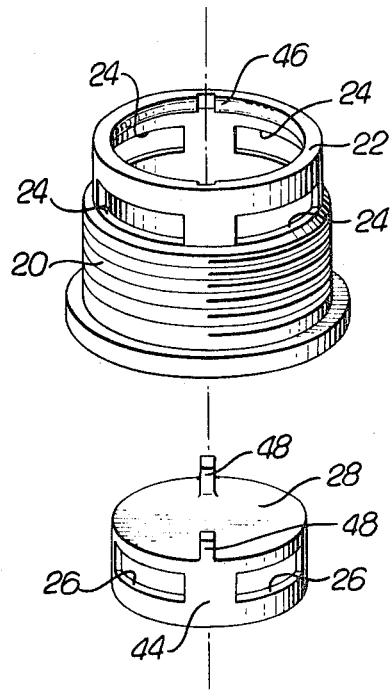

3,559,690

DIVERTER VALVE

BACKGROUND OF THE INVENTION

This invention relates to household plumbing fixtures, and particularly to a diverter valve used typically to direct the flow of water either to a shower head or to a tub filler spout. More particularly, this invention relates to diverter valves accommodated in the tub filler spout, or forming a part of a common assembly with such tub filler spout.

It has been common in the past to provide a valve seat in the spout controlled by a closure that is lifted into closed position by the aid of a stem that projects upwardly through the top of the spout. Industrial designers justifiably object to appearance of the stem and handle. Additionally, such valves are often difficult to seal.

Increasing use has been recently made of cylinder valves fitted into the spout opening. Water normally flows through the cylinder. However, when the cylinder is pushed upwardly, the cylinder is closed and stays closed under the force of water pressure. When the water pressure is relieved, the cylinder automatically drops back to its normally open position. Sealing such cylinder valves has been a problem. First of all, the water should be constrained to flow through the cylinder when the valve is open; and none should flow either through the cylinder or around it when it is closed. A tight O-ring seal works at cross-purposes with the automatic return. Thus if the seal is tight enough to prevent leakage, it will normally impose a frictional restraint that keeps the cylinder up after the water pressure is relieved. As a result, a slight amount of leakage has been tolerated.

BRIEF SUMMARY OF THE INVENTION

The primary object of this invention is to provide a diverter valve utilizing the cylinder principle whereby the unsightly valve stem is avoided, but in which an effective seal is provided without interference with the automatic return function of the cylinder valve.

For this purpose, I provide an O-ring that is operated upon in a unique manner. When the valve is open, the cylinder, under the influence of hydraulic pressure, acts on the inside of a loose fitting O-ring to establish an effective seal. When the cylinder is lifted to closed position, the force on the O-ring due to the cylinder is relieved. However, a caged lid is now acted upon by hydraulic pressure so that its skirt operates as a gland again forcing the O-ring into tight sealing relationship. When the hydraulic pressure is relieved, the gland pressure if relieved and the now loose fitting O-ring freely allows the cylinder to fall.

Another object of this invention is to provide a watertight diverter valve of this character that can be made without adherence to close tolerances.

This invention possesses many other advantages and has other objects which may be made more clearly apparent from a consideration of one embodiment of the invention. For this purpose, there is shown a form in the drawings accompanying and forming a part of the present specification, and which drawings, unless described as diagrammatic or unless as otherwise indicated, are to scale. This form will now be described in detail, illustrating the general principles of the invention; but it is to be understood that this detailed description is not to be taken in a limiting sense, since the scope of this invention is best defined by the appended claims.

BRIEF DESCRIPTION OF THE DRAWINGS

FIG. 1 is a diagrammatic view showing a shower head, a spout and flow valves, a diverter valve embodying the present invention being incorporated in the spout.

FIGS. 2 and 3 are enlarged axial sectional views of the diverter valve structure taken along the plane corresponding to lines 2—2 of FIG. 1, but showing the valve respectively in open and closed position.

FIG. 4 is a bottom plan view of the spout extension taken in the plane indicated by line 4—4 of FIG. 2.

FIGS. 5 and 6 are sectional views taken along planes corresponding to lines 5—5 and 6—6 of FIG. 2.

FIG. 7 is an enlarged fragmentary sectional view taken along the plane corresponding to line 7—7 of FIG. 2.

FIG. 8 is an exploded pictorial view illustrating the cage and lid components of the valve.

DETAILED DESCRIPTION

Hot and cold water is conducted to a shower head 10 (FIG. 1) by the aid of a pipe 12, and to a tub filler spout 14 by the aid of a pipe 16. Flow of hot and cold water into the pipes 12 and 16 is controlled in this instance by a mixer valve structure 18. Both pipes 12 and 16 are open to the outlet of the mixer valve. As long as the spout is open, the water flows through it since the shower head is higher. However, when the spout is closed, water is diverted to the shower head.

Water in the spout 14 (FIG. 2) flows around an upstanding flange 20 in a cage 22; through generally rectangular ports 24 (see also FIG. 8) in the cage flange 22; through registering apertures 26 in a lid structure 28; to the upper end of a cylinder 30 (FIG. 2); and finally, through the cylinder 30.

The cage 22, which may be a machined brass casting or a plastic molded part, is held in place by a threaded engagement with the mouth of the spout. An O-ring 32 provides a seal. The cage 22 has a lower bore portion 34 in which the cylinder 30 is guided for axial movement and an upper enlarged bore portion 36 in which the lid 28 is guided for axial movement.

The upper end of the cylinder 30 is flared outwardly providing a flange 38 that partially overlies an upwardly extending shoulder 40 formed between the bore portions. An O-ring 42 made of neoprene or other flexible resilient material, is located at the shoulder. Its internal diameter is nominally slightly greater than the external diameter of the cylinder 30 whereby, unless constricted, the O-ring exerts no significant frictional restraint against longitudinal or axial movement of the cylinder. The flange 38 when urged downwardly stresses the O-ring, thereby preventing leakage between the exterior of the cylinder 30 and the bore 34. The weight of the cylinder 30 coupled with hydraulic force acting over the annular area of the flange 38 provides a force sufficient to achieve an effective seal.

The lid 28, which may be made of molded plastic, is generally of inverted cup shape, the ports 26 being formed in a downwardly extending skirt 44. The lid is confined in the upper bore portion 36 by an internal bead 46 at the upper end of the cage. The lid is permitted a slight axial movement. In its upper position (FIG. 2), the lower end of the skirt is spaced just above the O-ring 42. It may move downwardly against the O-ring in a manner to be described hereinafter. The lid may come to rest on the O-ring 42 or it may not, depending on the vagaries of friction. The lid is held against rotation by the aid of a pair of locating pins 48 (see FIGS. 7 and 8) cooperable with slotted portions of the bead 46. Accordingly, the ports 24 and 26 of the cage and lid are held in registry. The lid 28 is installed by being forced past the bead 46.

In order to close the diverter valve, the cylinder 30 is lifted so that its upper end seals against the lid 28. To facilitate a grasp, a handle 50 which may be made of molded plastic is snapped on the lower end of the cylinder. When the cap or lid 28 is engaged (FIG. 3), hydraulic pressure acting on the upper side of the lid now tends to move the lid downwardly. At the same time, the hydraulic pressure acting on the under side of the cylinder flange 38 keeps the parts in engagement.

As the lid 28 moves downwardly, the O-ring 42 is engaged. The end of the skirt is beveled so as to impose a constricting force on the O-ring, causing it tightly to grip the cylinder while it is also forced against the shoulder 40. A tight seal is thus provided.

When the hydraulic pressure is relieved, as by closing the mixer valve 18, the constricting force on the O-ring is relieved and the holding force on the flange 38 is removed. The cylinder 30 drops away under the influence of gravity, unencumbered by friction of the now unconstricted O-ring 42.

I claim:

1. In a diverter valve:
   a. a cylinder,
   b. means adapted to be carried by or forming a part of a spout or the like, and mounting said cylinder for axial movement;
   c. an annular sealing member made of resilient flexible material and positioned between the cylinder and said mounting means, said annular sealing member having a normal unstressed configuration such as to impose insufficient restraint upon said cylinder to permit its downward movement under the influence of gravity;
   d. a lid positioned in the path of upward movement of said cylinder;
   e. means mounting said lid so as to subject the top of said lid to hydraulic forces, said mounting means permitting limited longitudinal movement of said lid;
   f. said cylinder when in a lower position, being spaced from said lid to permit flow of fluid into the upper end of said cylinder;
   g. means operated by hydraulic pressure to maintain said lid in closing relationship with the top of said cylinder when said cylinder and lid are placed in contact; and
   h. means operated by downward movement of said lid under the influence of hydraulic pressure when said lid and cylinder are in contact for constricting said annular sealing member about said cylinder whereby reduction in hydraulic pressure frees said cylinder for downward movement under the influence of gravity.

2. The diverter valve as set forth in claim 1 together with means carried by said cylinder engaging said annular sealing member when said cylinder is in its lower position for compressing said sealing member to establish a seal.

3. The diverter valve as set forth in claim 1 in which said mounting means for said lid and said mounting means for said cylinder comprises a cage threadedly accommodated in the mouth of said spout, said cage having a ported flange the exterior portion of which is in communication with the fluid in said spout; said lid having a skirt portion provided with ports registering with said ports of said cage and into which the upper end of said cylinder may be moved.

4. The diverter valve as set forth in claim 3 in which said annular sealing member is an O-ring, said skirt portion having an internal chamber for constricting said O-ring into engagement with said cylinder.

5. The diverter valve as set forth in claim 1 in which said cylinder is flared at its upper end forming a flange engaging said sealing member when said cylinder is moved downwardly to expand said sealing member to force it into sealing relationship with said cylinder mounting means.

6. The diverter valve as set forth in claim 5 in which said mounting means for said lid and said mounting means for said cylinder comprises a cage threadedly accommodated in the mouth of said spout, said cage having a ported flange the exterior portion of which is in communication with the fluid in said spout; said lid having a skirt portion provided with ports registering with said ports of said cage and into which the upper end of said cylinder may be moved.

7. The diverter valve as set forth in claim 6 in which said annular sealing member is an O-ring, said skirt portion having an internal chamber for constricting said O-ring into engagement with said cylinder.

8. In a diverter valve structure:
   a. a spout having an internally threaded discharge opening;
   b. a cage threadedly accommodated in said spout opening, said cage having a through bore with a larger diameter portion at its upper inner end, and a smaller diameter portion at its lower outer end, there being an upwardly extending shoulder at the juncture of said bore portions; the upper inner portion of said cage having peripheral clearance in said spout for access of fluid thereto; said upper inner portion of said cage having a number of ports for flow of fluid into said cage; said upper inner portion of said cage having an inwardly extending bead or rib;
   c. an O-ring located at said shoulder, and having a nominal internal diameter slightly greater than said lower bore portion;
   d. a cylinder guidingly accommodated in said lower bore portion for longitudinal movement therein, said cylinder having an outwardly flared flange at its upper end overlying said O-ring and operative to expand said O-ring into sealing engagement with the upper enlarged bore portion upon downward movement of said cylinder;
   e. a lid guidingly accommodated in said upper bore portion for limited longitudinal movement therein and a depending skirt portion provided with a number of ports registering with the ports of said cage, said lid being positioned in the path of upward movement of said cylinder for sealing engagement therewith; the end of said depending skirt portion being provided with an internal chamber engageable with said O-ring to constrict said O-ring into sealing engagement with said cylinder upon downward movement of said lid;
   f. said lid being movable downwardly so that its skirt portion constricts said O-ring upon the application of a net hydraulic pressure resulting from the movement of said cylinder against said lid;
   g. the said flange of said cylinder providing an annular area over which fluid force acts when said cylinder and said lid are in engagement for holding said lid and said cylinder together; and
   h. the reduction of hydraulic pressure resulting in the removal of constricting forces on said O-ring and the separation of said cylinder and lid whereby said cylinder substantially freely drops to open position in response to reduction in said hydraulic pressure.

9. All of the novel features shown or described, and all of the novel combinations of features shown or described.